United States Patent [19]
Otake et al.

[11] Patent Number: 4,692,253
[45] Date of Patent: Sep. 8, 1987

[54] METHOD AND APPARATUS FOR REMOVING EXTRANEOUS MATTERS

[75] Inventors: Katsumoto Otake, Hitachi; Masahiko Miyai, Mito; Yasuteru Mukai; Isamu Okouchi, both of Hitachi, all of Japan

[73] Assignee: Hitachi, Ltd., Tokyo, Japan

[21] Appl. No.: 635,223

[22] Filed: Jul. 27, 1984

[30] Foreign Application Priority Data

Aug. 1, 1983 [JP] Japan ................. 58-139449

[51] Int. Cl.[4] ........................................... B10D 23/24
[52] U.S. Cl. .................................. 210/791; 210/108; 210/111; 210/412; 210/425; 137/875; 137/877
[58] Field of Search ............... 210/108, 791, 798, 411, 210/412, 433.1, 434, 117, 101, 397, 111, 99, 421, 422, 424, 425, 90, 103, 405, 409, 106, 420, 305, 306, 320, 414, 456; 137/875, 887

[56] References Cited

U.S. PATENT DOCUMENTS

| | | | |
|---|---|---|---|
| 3,789,992 | 2/1974 | Treplin et al. | 210/421 |
| 3,828,930 | 10/1974 | Eimer et al. | 210/421 |
| 4,311,591 | 1/1982 | Eimer et al. | 210/405 |
| 4,394,262 | 7/1983 | Bukowski et al. | 210/108 |
| 4,482,461 | 11/1984 | Hindman et al. | 210/108 |
| 4,543,188 | 9/1985 | Okouchi et al. | 210/405 |

Primary Examiner—Andrew H. Metz
Assistant Examiner—Sharon T. Cohen
Attorney, Agent, or Firm—Fay, Sharpe, Beall, Fagan, Minnich & McKee

[57] ABSTRACT

Method and apparatus for removing extraneous matters from cooling water used in a tubular heat exchanger such as a condensor is disclosed. When a pressure difference between the portions upstream and downstream of a filter element exceeds a predetermined threshold value set in advance in accordance with the flow rate of the cooling water, a blow-down operation is started to remove the extraneous matters scraped off of the outer peripheral surface of the filter element by a turning flow. The extraneous matters are removed at a rate of clogging of the filter element of 50%, irrespective of the flow rate of the cooling water. The clogging rate can be sensed accurately, and the blow-down operation is effected with necessary and sufficient frequency.

5 Claims, 8 Drawing Figures

METHOD AND APPARATUS FOR REMOVING EXTRANEOUS MATTERS

BACKGROUND OF THE INVENTION

1. Field of the Invention

This invention relates to a method and apparatus for removing aquatic organisms in a cooling water system used for a tubular heat exchanger such as a condensor, from the cooling water system. More particularly, the present invention relates to a method and apparatus for removing those extraneous matters, which are filtrated onto the outer circumferential surface of a filter element disposed inside a casing, outside the system by means of a turning flow.

2. Description of the Prior Art

A considerable distance exists from an intake to a condensor in a thermal power plant or an atomic power plant using brine as cooling water, and extraneous matters such as small seaweed, infant shellfish, and the like that pass through a screen of the intake grow inside a cooling water pipe. Since these extraneous matters are likely to clog the small cooling water pipes of the condensor, an apparatus for removing the extraneous matters is disposed upstream, and in the vicinity, of the condensor so as to remove them.

Japanese Patent Publication No. 49898/1980, for instance, proposes an apparatus for removing extraneous matters. A blow-down operation, which is carried out to discharge the extraneous matters deposited to a filter element, is started when a pressure difference between the pressure upstream of the filter element and the pressure downstream thereof (hereinafter called "filter element differential pressure") exceeds a predetermined value.

A butterfly wave of the extraneous matter removing apparatus is caused to displace by a predetermined angle in either one of the closing directions so as to generate a turning flow along the outer circumference of the filter element. A blow-down valve is opened simultaneously with the displacement of the butterfly valve to discharge the extraneous matters together with part of the cooling water.

In a system which controls the flow rate of the cooling water to a minimum necessary level in accordance with a turbine load, the filter element differential pressure varies remarkably with the flow rate of the cooling water if the flow rate changes, even though the rate of clogging of the filter element is constant.

The relation between the rate of clogging of the filter element and the filter element differential pressure P in the blow-down operation will be described with reference to FIG. 8.

This graph shows the flow rate of cooling water passing through the extraneous matter removing apparatus for an inlet flow velocity v in the piping between a cooling water pump and the extraneous matter removing apparatus. The apparatus is set so that the blow-down operation occurs when the filter element differential pressure $\Delta P$ exceeds a preset value, for example $\Delta P_2$.

The blow-down operation is effected at a rate of clogging of 50% when the inlet flow velocity is $v_2$, at a rate of 70% when the inlet flow velocity is $v_1$ at which the flow rate of the cooling water is small, at a rate of 30% when the inlet flow velocity is $v_3$ at which the flow rate of the cooling water is great, and at a rate of 0% when the inlet flow velocity is $v_4$ at which the flow rate of the cooling water is extremely great.

If the flow velocity of the cooling water is low, the blow-down operation is not effected even though the filter element gets clogged to a somewhat high extent. When the flow rate of the cooling water is great, the blow-down operation is frequently effected, even though the filter element is hardly clogged, and the cooling water is discharged in vain.

If the blow-down operation is not effected even though the filter element is clogged to a considerable extent, the extraneous matters deposited to the filter element are not scraped off even when the blow-down operation is next carried out, so that the blow-down operation is no longer effective to recover the filter element.

At the start of the blow-down operation, the blow-down valve is fully opened simultaneously with the displacement of the butterfly valve. Because the extraneous matters are discharged while their concentration is low and in addition, because the blow-down valve is kept open for a long period, the cooling water is discharged in vain.

SUMMARY OF THE INVENTION

It is therefore an object of the present invention to provide a method and apparatus for removing extraneous matters which can perform the blow-down operation in accordance with the flow rate of cooling water.

It is another object of the present invention to provide a method and apparatus for removing extraneous matters which can perform the blow-down operation with necessary and sufficient frequency.

It is still another object of the present invention to provide a method and apparatus for removing extraneous matters which can perform the blow-down operation capable of recovering clogging of a filter element.

It is a further object of the present invention to provide a method and apparatus for removing extraneous matters which can minimize the flow rate of cooling water that is discharged outside the system together with the extraneous matters.

The present invention carries out the blow-down operation when a filter element differential pressure of the apparatus for removing extraneous matters exceeds a predetermined threshold value that is set in accordance with the flow rate of cooling water.

The blow-down operation in the present invention will now be explained. As the extraneous matters are deposited onto the filter element of the apparatus, a specific rate of clogging of the filter element is reached. When the filter element differential pressure exceeds a predetermined threshold value set in accordance with the inlet flow velocity, that is, a predetermined threshold value set in advance in accordance with the flow rate of the cooling water, the blow-down operation is started.

When the filter element differential pressure exceeds the threshold value set in accordance with the flow rate of the cooling water, the blow-down operation is effected, so that the extraneous matters are removed at a specific rate of clogging of the filter element irrespective of the flow rate of the cooling water.

A case in which the blow-down operation is started at a specific rate of clogging of the filter element of 50% will be described. In FIG. 5, the threshold value is set in accordance with a characteristic curve at the rate of clogging of the filter element of 50%.

The threshold value is changed in accordance with the inlet flow velocity v, that is, the flow rate of the cooling water.

The thresold value is set in accordance with the characterisitc curve at the rate of clogging of the filter element of 50% so that the threshold value is $\Delta P_1$ when the inlet flow velocity is $v_1$, is $\Delta P_2$ when the inlet flow velocity is $v_2$, and is when the inlet flow velocity is $v_3$.

According to this arrangement, the predetermined threshold value represents the filter element differential pressure under a predetermined state of clogging at the flow rate of the cooling water at that time, even if the flow rate of the cooling water changes, so that the blow-down operation is always carried out when the rate of clogging of the filter element exceeds the predetermined value.

Next, the relation between the rate of clogging of the filter element and the filter element differential pressure $\Delta P$ will be explained using the inlet flow velocity as a parameter with reference to FIG. 6. The rate of clogging of the filter element is expressed in terms of quantities of the extraneous matters deposited to the filter element.

When the rate of clogging of the filter element is close to 50%, the filter element differential pressure $\Delta P$ is under the stable state even if the inflow quantity of the extraneous matters changes to some extends, and the state of fluidization inside the apparatus for removing the extraneous matters is also stable.

When the rate of clogging of the filter element is above 60%, however, the filter element differential pressure $\Delta P$ changes remarkably even if the inflow quantity of the extraneous matters changes slightly, and this is a state of fluidization which the inflowing extraneous matters are deposited extremely rapidly to the filter element.

If the blow-down operation is started, the extraneous matters can be easily separated and discharged from the surface of the filter element at a rate of clogging of the filter element of up to 50%. If the rate of clogging exceeds 60%, however, it is not possible to remove easily the extraneous matters from the surface of the filter element, and a washing time becomes also elongated.

The relation between the passage of time from the start of generation of a turning flow and the concentration of the extraneous matters gathering in the proximity of a discharge pipe of the casing is measured. As shown in FIG. 7, the concentration of the extraneous matters gets into saturation within the passage of time of about 5 minutes at the rates of clogging of the filter element of 50% and 30%.

There is no technical significance if the passage of time after the start of generation of the turning flow is more than 5 minutes. If this time is unnecessarily elongated, the apparatus is operated for an extended period with the butterfly valve being kept throttled, so that a great load is applied to the cooling water pump.

The present invention starts the blow-down operation when the filter element differential pressure exceeds the threshold value that is determined in advance in accordance with the flow rate of the cooling water. Accordingly, the rate of clogging of the filter element can be detected accurately, and the blow-down operation can be carried out with necessary and sufficient frequency.

The present invention also carries out automatically the blow-down operation when the rate of clogging of the filter element reaches a predetermined value, so that clogging of the filter element does not proceed to a level such that clogging can no longer be recovered by the blow-down operation.

The present invention can reduce the necessary flow rate of the cooling water because the extraneous matters are discharged only after the turning flow is generated around the filter element for a predetermined period so as to scrape off the extraneous matters deposited onto the filter element.

DESCRIPTION OF THE PREFERRED EMBODIMENT

Hereinafter, a preferred embodiment of the invention will be described with reference to the accompanying drawings.

Figure 1:
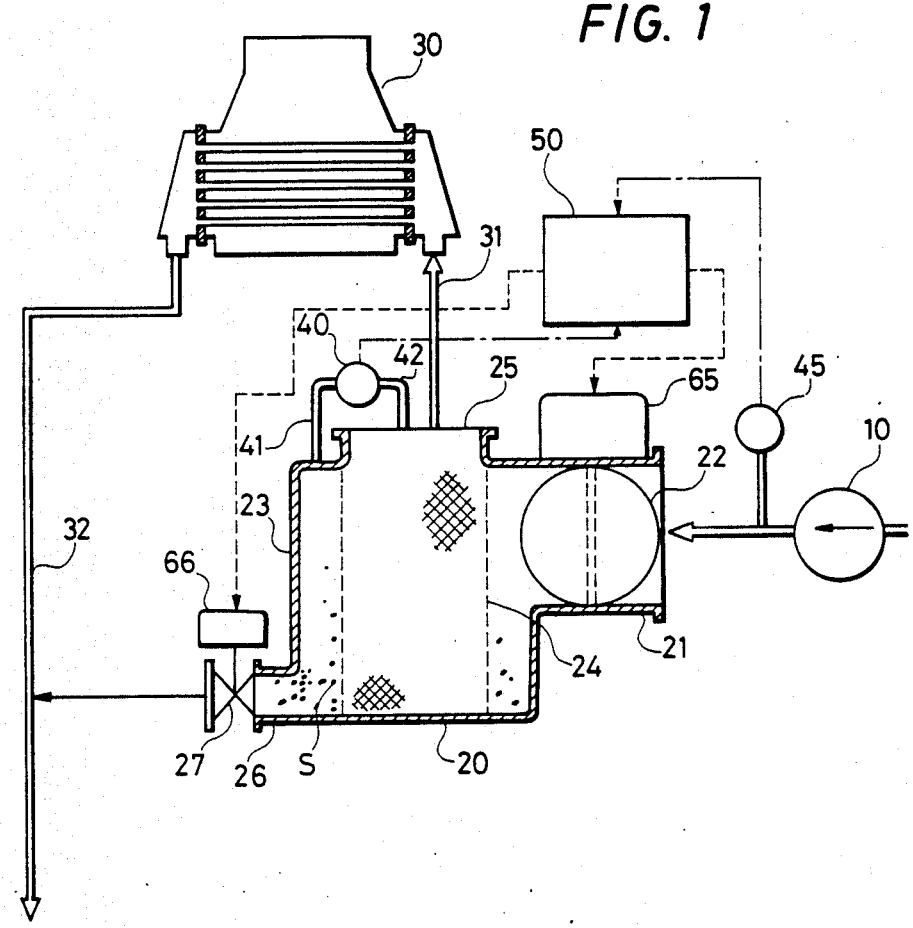
FIG. 1 is a system diagram of an apparatus for removing extraneous matters in accordance with one embodiment of the present invention.

The apparatus for removing extraneous matters in accordance with the present invention is illustrated in FIG. 1 together with a cooling water system. The cooling water sucked from the inlet is pressurized by a cooling water pump 10, and is then sent to an inlet pipe 21 of the apparatus 20 for removing the extraneous matters. A butterfly valve 22 is disposed in the inlet pipe 21. This butterfly valve 22 is normally opened fully.

After entring a substantially cylindrical casing 23 having a circular section, the cooling water flows from outside to inside of a substantially cylindrical filter element 24 having a circular section. The cooling water reaches a condensor 30 from an outlet pipe 25 through an inlet cooling water pipe 31 of the condensor, and after subjected to heat-exchange in the condensor 30, the cooling water is returned to the sea through an outlet cooling water pipe 32.

The extraneous matters S contained in the cooling water are deposited onto the outer circumferential surface of the filter element 24. The quantity of the extraneous matters S deposited to the filter element 24 is indirectly detected as a pressure difference between the upstream and downstream portions of the filter element (filter element differential pressure) by a differential pressure gauge 40 that is interposed between pressure conduits 41 and 42 that are disposed upstream and downstream of the filter element 24, respectively.

When this filter element differential pressure value exceeds a threshold value determined by a flow rate sensor 45 that is interposed between the cooling water pump 10 and the apparatus 20 for removing the extraneous matters, a blow-down operation controller 50 generates a blow-down operation instruction. This blow-down operation instruction is applied to a butterfly valve actuator 65 and to a blow-down valve actuator 66.

Figure 2:
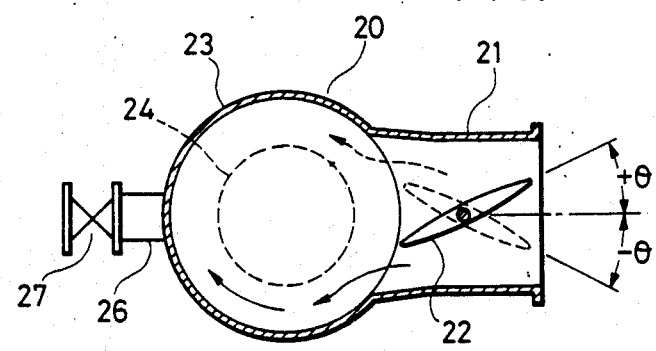
FIG. 2 is a plan view of the apparatus during the blow-down operation.

The butterfly valve 22 moves in a closing direction from the fully opened position to positions indicated by solid line and dash line in FIG. 2, and the blow-down valve 27 is opened fully. During the blow-down operation, the butterfly valve 22 first keeps the position of the solid line in FIG. 2 for a predetermined period such as for 10 minutes, thereby causing a turning flow counter-clockwise around the filter element 24. It then keeps the position of the dash line in FIG. 2 for a predetermined period such as 10 minutes, thereby causing clockwise a turning flow.

In this manner, the butterfly valve 22 deflects the cooling water from the inlet pipe 21 in the tangential direction of the filter element 24. When the butterfly valve 22 moves by a predetermined angle, e.g., 30°, in the closing direction, for example, it is kept at a position in the tangential direction of the outer circumference of the filter element 24.

The turning flow around the filter element 24 scrapes off the extraneous matters S deposited to the outer circumferential surface of the filter element therefrom, which move close to the discharge pipe 26 and the blow-down valve 27, and are thereafter discharged outside the system from the blow-down valve 27.

Figure 3:
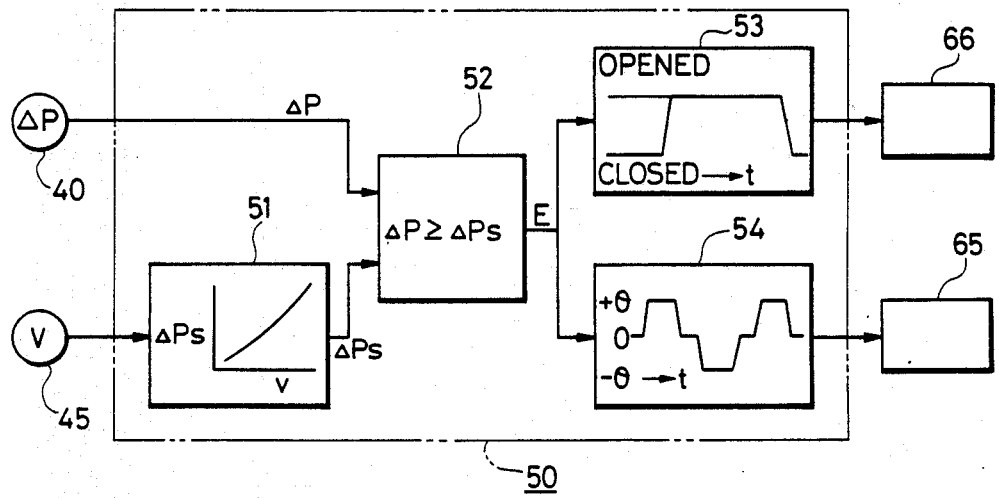
FIG. 3 is a block diagram of a blow-down operation controller.

The blow-down operation controller 50 will be explained with reference to FIG. 3. A threshold value setter 51 sets a set value $\Delta P_s$ with respect to a desired rate of clogging of the filter element in accordance with the flow rate of the cooling water that is picked up by the flow rate sensor 45. This setter 51 is a certain kind of function generator, and produces the set value $\Delta P_s$ in accordance with the inlet flow velocity v.

The set value $\Delta P_s$ and the differential pressure signal value $\Delta P$ from the differential pressure gauge 40 are applied to a comparator 52, which compares them with each other. When the differential signal value $\Delta P$ becomes greater than the set value $\Delta P_s$, a blow-down operation start signal E is generated. When this start signal E is generated, both blow-down valve controller 53 and butterfly valve controller 54 start operating.

Both controllers 53 and 54 incorporate therein timers, respectively, and apply valve control signals to actuators 66 and 65 so that both blow-down valve 27 and butterfly valve 22 exhibit the opening characteristics shown in the blocks of both controllers 53 and 54, respectively.

The opening characteristics of the butterfly valve 22 and blow-down valve 27 will be described with reference to FIG. 4. In the normal operation, the blow-down valve 27 is completely closed while the butterfly valve 27 is completely opened.

When the comparator 52 produces the blow-down operation start signal E, the blow-down valve keeps its completely closed state while only the butterfly valve 22 is rotated counter-clockwise by an angle $\theta°$, and causes a turning flow around the filter element 24 in the clockwise direction. As a result, the extraneous matters deposited to the filter element 24 are scraped off and move towards the lower part of the casing 23. After the passage of a time $T_o$ from the start of operation of the blow-down valve, the blow-down valve is completely opened, and the extraneous matters moving towards the lower part of the casing 23 are discharged outside the system.

After the passage of the time $T_o$, further, the butterfly valve 22 is returned to its completely opened position, and is kept completely opened for a period of time $T_2$ in which the turning flow inside the casing 23 settles. Thereafter, the butterfly valve 22 is rotated clockwise by the angle $\theta°$, and causes a turning flow around the filter element 24 in the counter-clockwise direction. Because the direction of the turning flow thus changes, the extraneous matters S that have not been scraped off by the previous turning flow are now scraped off from the filter elment 24, and are then discharged from the blow-down valve 27.

The butterfly valve 22 is kept completely open for the period of time $T_2$ in which the turning flow inside the casing 23 settles. Thereafter, the butterfly valve 22 is again rotated by the angle $\theta$ in the counterclockwise direction, and a turning flow around the filter element 24 in the clockwise direction occurs. After the time $T_1$ has further passed, the butterfly valve 22 is completely opened while the blow-down valve 27 is completely closed, thereby returning to the normal operation.

Figure 4:
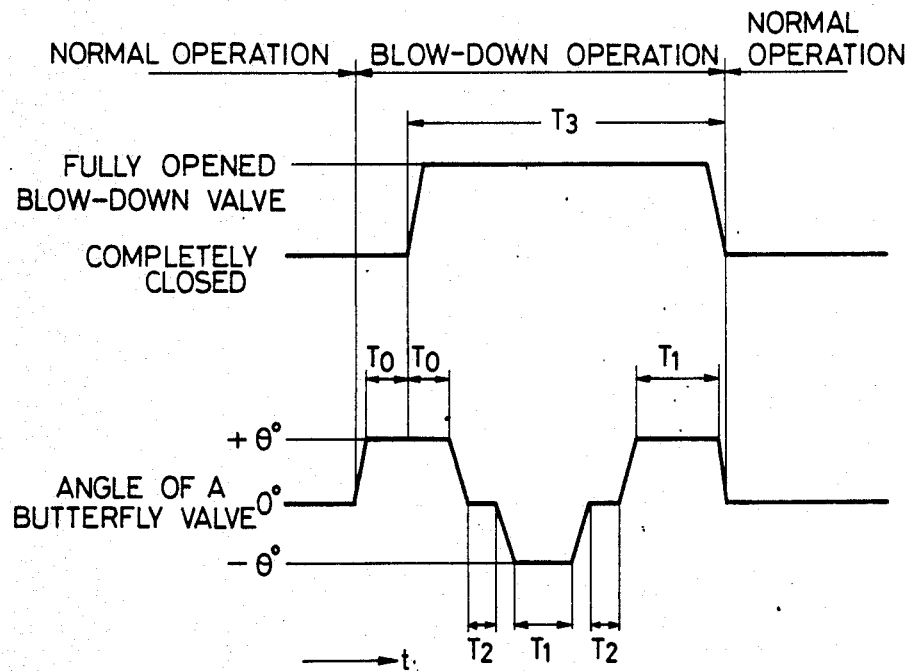
FIG. 4 is a diagram showing the characteristics of blow-down valve and butterfly valve.
Figure 6:
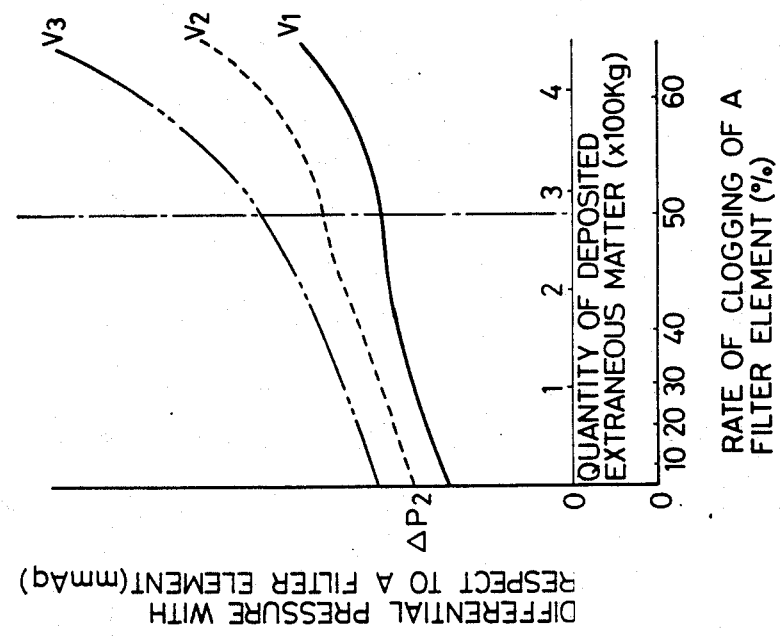
FIG. 6 is a diagram showing the relation between the rate of clogging of the filter element and the filter element differential pressure.
Figure 5:
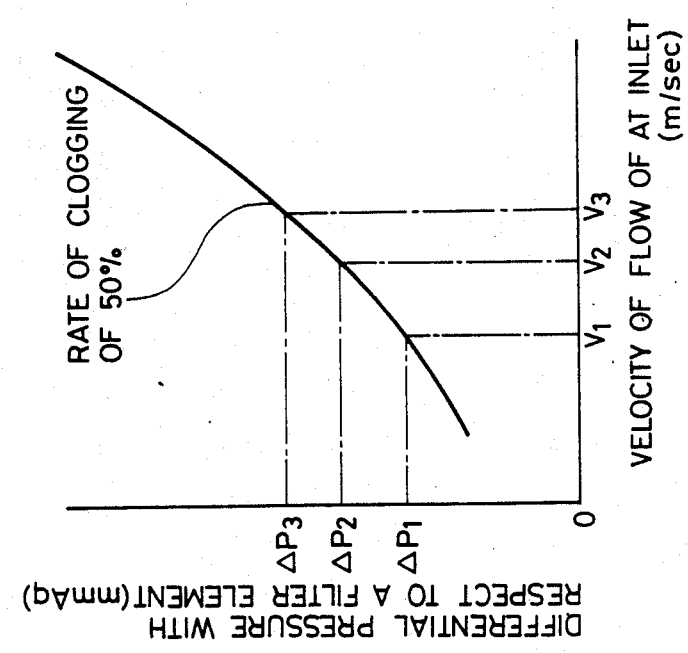
FIG. 5 is a diagram showing the relation between the inlet flow velocity and the filter element when the rate of clogging of the filter element is 50%.
Figure 8:
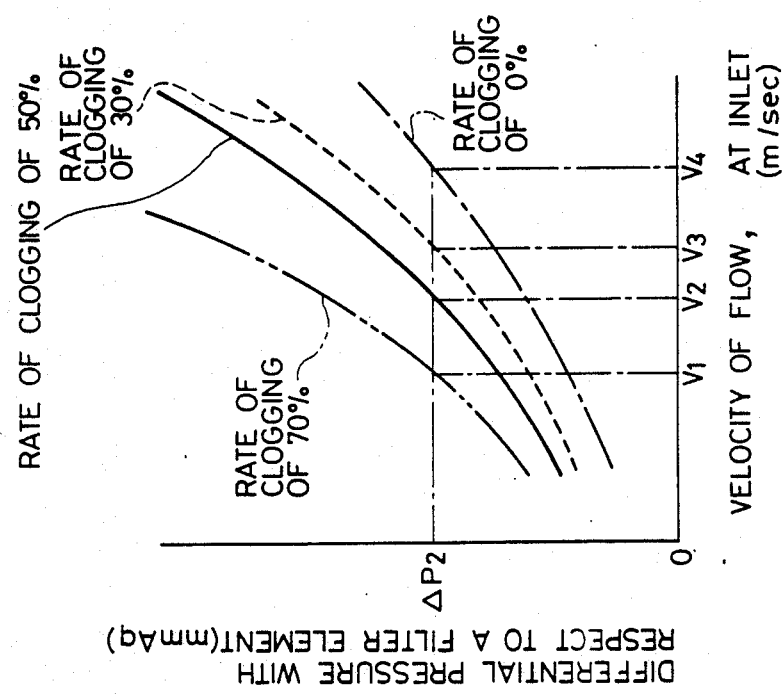
FIG. 8 is a diagram showing the relation between the inlet flow velocity and the filter element differential pressure at various rates of clogging of the filter element.
Figure 7:
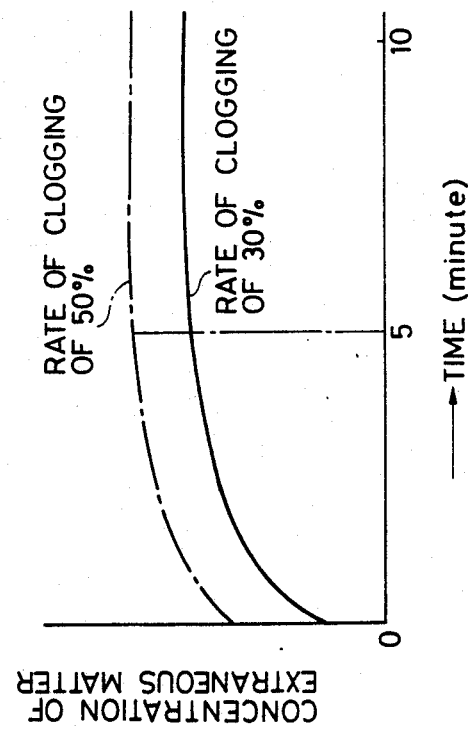
FIG. 7 is a diagram showing the change of the concentration of extraneous matters with the passage of time when the clogging rates of the filter element are 50% and 30%, respectively.

In accordance with the pattern illustrated in FIG. 4, the turning flow changes from the clockwise direction counterclockwise direction clockwise direction. Though the optimal values of the opening characteristics may change in accordance with the dimension of the extraneous matter removing apparatus or other factors, a desirable result can be obtained when $T_0=5$ minutes, $T_1=10$ minutes, $T_2$ 1 minute and $\theta=30°$.

In the embodiment described above, the blow-down operation of the extraneous matter removing apparatus is controlled by detecting the filter element differential pressure under its stable state where the rate of clogging by the inflowing extraneous matters is up to 50%. In other words, setting of the purification differential pressure of the extraneous matter removing apparatus in this case is a filter element differential pressure that corresponds to the rate of clogging of the filter element of 50%.

Since the rate of clogging of the filter element can be kept below about 50% as described above, the resistance of the cooling water feed system including the extraneous matter removing apparatus can be reduced.

The embodiment of the invention described above is arranged in such a fashion that before the blow-down valve 27 is opened, the butterfly valve 22 is rotated in the closing direction to cause the turning flow, and a part of the extraneous matters S is scraped off from the filter element 24 and is then moved close to the discharge pipe 26, so that after the concentration of the extraneous matters at that portion is increased, they are discharged by opening the blow-down valve 27.

The timing at which the blow-down valve 27 is opened completely is delayed by five minutes after the displacement of the butterfly valve 22, and this makes it possible to reduce the flow rate of the flowing cooling water from the conventional value of from 8 to 12% (the ratio with respect to the flow rate of the total cooling water) to from 5 to 10%.

In the embodiment described above, the flow rate of the cooling water passing through the extraneous matter removing apparatus is detected as the flow velocity at the inlet portion of the casing, but the set pressure difference may be determined by the pressure difference before and after a fixed orifice.

What is claimed is:

1. A method of removing extraneous matters from cooling water, comprising the steps of:

introducing cooling water into a casing;

passing said cooling water at a flow rate within an operating range of flow rates through a filter element disposed in said casing, and filter separating extraneous matters contained in said cooling water therefrom, so that at least some of the separated extraneous matter deposit on the upstream side of said filter element to increase the clogging of the filter element;

delivering said cooling water passing through said filter element from said casing;

detecting the pressure difference between the portions upstream and downstream of said filter element, and generating a pressure difference signal during said step of passing;

detecting the flow rate of said cooling water, and generating a flow rate signal during said step of passing;

providing characteristic pressure differences versus flow rates for a specific percent of filter clogging over the operating range of flow rates;

setting a threshold value of pressure difference in accordance with the provided characteristic pressure difference between the portions upstream and downstream of said filter element at the specific percent of clogging of said filter element and at the flow rate of the flow rate signal of the cooling water, during said step of passing;

comparing said pressure difference signal with said threshold value, and generating a control signal when said pressure difference signal exceeds said threshold value;

thereafter generating a turning flow of the cooling water around said filter element in response to said control signal when the pressure difference between the portions upstream and downstream of said filter element exceeds said threshold value so that the turning flow is sufficient for scraping off said extraneous matters deposited to said filter element therefrom; and discharging said extraneous matters thus scraped off from said casing together with a part of said cooling water in response to said control signal.

2. The method of removing extraneous matters as defined in claim 1 wherein said steps of providing and setting are in accordance with the specific percent of clogging of said filter element being substantially 50%.

3. The method of removing extraneous matters as defined in claim 1 wherein said steps of setting and providing are in accordance with the specific percent of clogging of said filter element being substantially 50% and said step of discharging said extraneous matters is carried out after a passage of a specific period of time from said step of scraping off said extraneous matters.

4. An apparatus for removing extraneous matters from cooling water, comprising:

a casing;

an inlet pipe for introducing cooling water containing extraneous matters, disposed in said casing;

an outlet pipe for delivering said cooling water, disposed in said casing;

a filter element means for separating said extraneous matters from said cooling water, disposed in said casing;

means for passing said cooling water at a flow rate within an operating range of flow rates through the filter element disposed in said casing, and for filter separating extraneous matters contained in said cooling water therefrom, so that at least some of the separated extraneous matters deposit on the upstream side of said filter element to increase the clogging of the filter element;

a butterfly valve for deflecting said cooling water containing said extraneous matters, disposed in said inlet pipe to produce a turning flow around said filter element;

an extraneous matter discharge port for discharging said extraneous matters, disposed in said casing;

a blow-down valve for discharging said extraneous matters outside the system, connected to said discharge port;

a butterfly valve actuator for operating said butterfly valve, disposed in said casing;

a blow-down valve actuator for operating said blow-down valve, disposed in said casing;

means for detecting the pressure difference between the portions upstream and downstream of said filter element, and generating a pressure difference signal;

means for detecting the flow rate of said cooling water, and generating a flow rate signal;

means for providing characteristic pressure differences versus flow rates for a specific percent of filter clogging over the operating range of flow rates;

a setter means for setting a threshold value of pressure difference in accordance with the provided characteristic pressure difference between the portions upstream and downstream of said filter element at the specific percent of clogging of said filter element and at the flow rate of the flow rate signal of the cooling water;

a comparator means for comparing said pressure difference signal with said threshold value, and generating signals for both of said butterfly valve actuator and said blowdown valve actuator when said pressure difference signal exceeds said threshold value;

means for operating said butterfly valve actuator for thereafter generating a turning flow of the cooling water around said filter element in response to said control signal when the pressure difference between the portions upstream and downstream of said filter element exceeds said threshold value so that the turning flow is sufficient for scraping off said extraneous matter deposited to said filter element therefrom; and means for operating said blow down valve actuator for discharging said extraneous matters thus scraped off from said casing together with a part of said cooling water in response to said control signal.

5. A method of removing extraneous matters according to claim 1 wherein said steps of providing and setting are in accordance with the specific rate of clogging of said filter element being substantially 50%, and further comprising the steps of:

after said first mentioned step of generating, generating a turning flow in the other direction around said filter element during said step of discharging said extraneous matters.

* * * * *